Jan. 29, 1924.
E. B. NENTWIG
1,482,316
SAFETY CHAIN FASTENER
Filed July 9, 1923      2 Sheets-Sheet 1
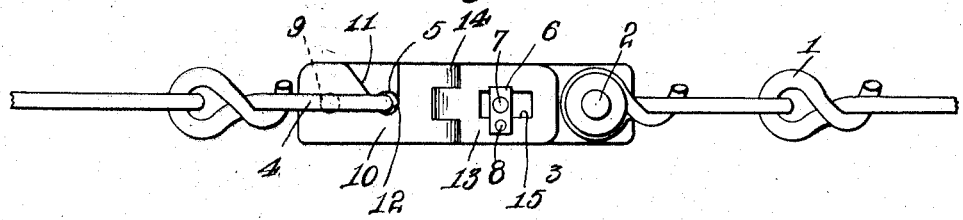
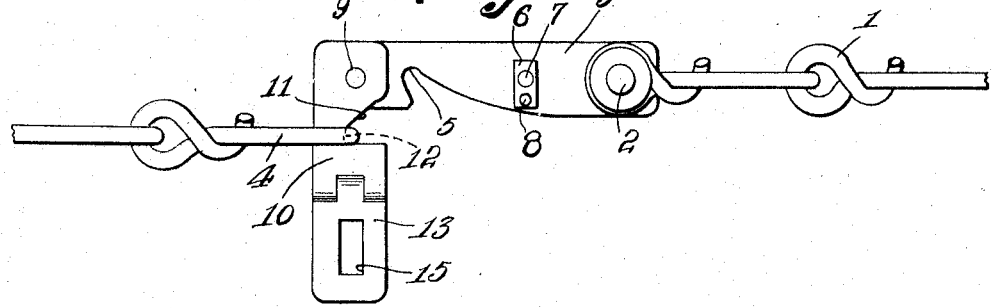
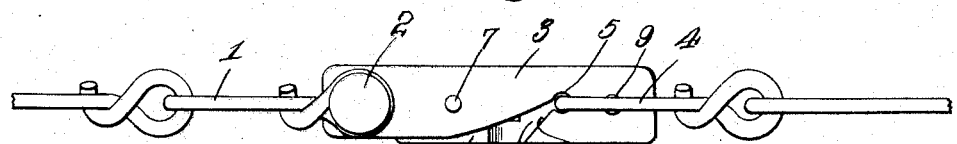
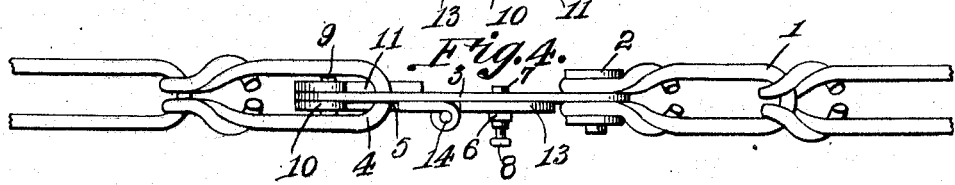
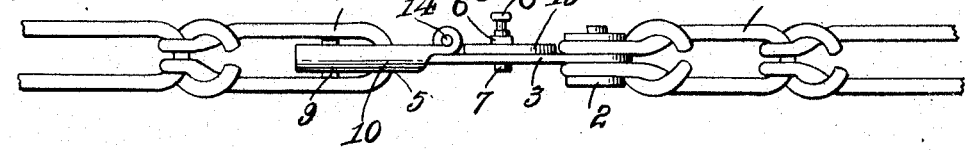
Ernest B. Nentwig
INVENTOR
BY Victor J. Evans
ATTORNEY Jan. 29, 1924.
E. B. NENTWIG
1,482,316
SAFETY CHAIN FASTENER
Filed July 9, 1923   2 Sheets-Sheet 2
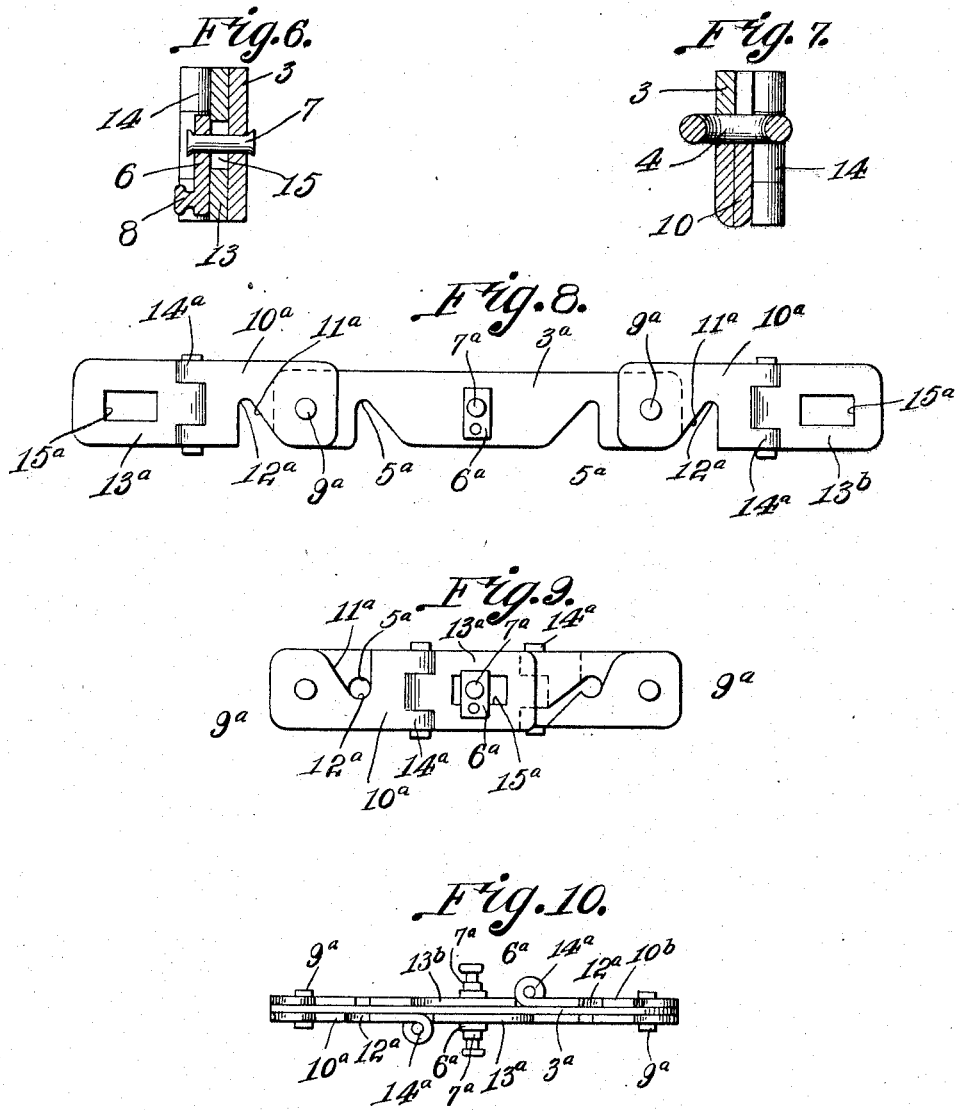

Patented Jan. 29, 1924.

1,482,316

UNITED STATES PATENT OFFICE.

ERNEST B. NENTWIG, OF JEFFERSON CITY, MISSOURI.

SAFETY CHAIN FASTENER.

Application filed July 9, 1923. Serial No. 650,460.

*To all whom it may concern:*

Be it known that I, ERNEST B. NENTWIG, a citizen of the United States, residing at Jefferson City, in the county of Cole and State of Missouri, have invented new and useful Improvements in Safety Chain Fasteners, of which the following is a specification.

The general object of my said invention is the provision of a safety chain fastener characterized by simplicity and strength in construction, by facility of manipulation in the fastening or connection of two chain portions, and by the capacity of affording leverage and thereby tightening a chain incident to the fastening of the chain for the connections of portions of the same together.

The invention is designed more particularly, though not necessarily, for use in association with the chains of automobile wheels.

To the attainment of the foregoing, the invention consists in the improvement as hereinafter described and definitely claimed.

In the accompanying drawings, forming part of this specification:—

Figure 1 is an elevation showing one side of a safety chain fastener constructed in accordance with my invention, the fastener being shown in association with the ends of a chain and being shown in a close state.

Figure 2 is a view showing the said fastener in an open state and with one end link in the notch in the body of the fastener.

Figure 3 is an elevation showing the opposite side of the fastener to that shown in Figure 1, and also showing the fastener in a close state.

Figures 4 and 5 are elevations of the opposite edges of the fastener.

Figure 6 is a transverse section taken through the fastener in the plane indicated by the line 6—6 of Figure 1.

Figure 7 is a cross-section through the fastener in the plane indicated by the line 7—7 of Figure 1.

Figures 8, 9 and 10 are views of a modification hereinafter explicity referred to.

Similar numerals of reference designate corresponding parts in Figures 1 to 7 of the drawings to which reference will first be made.

The chain 1 may be of the construction illustrated or of any other construction compatible with my invention. To one end of the chain 1 is pivotally or otherwise connected at 2 the body 3 of my novel fastener, the chain 1 being provided at its opposite end with a link 4, designed to be detachably arranged and held in the fastener as hereinafter described. In one edge and at a point remote from the connection 2, the fastener body is provided with a notch 5 to receive the link 4 as hereinafter set forth. At one side the body 3 is provided with a turn button 6 mounted to swing on a lateral post 7 carried by the body 3 and equipped with a finger piece 8. Pivotally connected at 9 to the body 3 at the opposite side of the notch 5, with reference to the post 7 and turn button 6 is the leverage-affording member 10 of the fastener. Said leverage-affording member 10 comprises an inner section 11 in which is a notch 12 to seat the link 4, and a sidewise swingable outer section 13 hingedly connected at 14 to the section 11 and having a slot 15 whereby it is adapted to be passed laterally inward over and beyond the turn button 6. It is within the purview of my invention to construct the inner section 11 of the member 10 in any approved manner. I prefer, however, to make a portion of the said section 11 of U-shape in cross-section so as to enable it in the closed state of the fastener to straddle the body 3 and thereby lend increased strength to the fastener as a whole, while closing the notch 5 in the body 3 so as to preclude the accidental displacement of the link 4 from the said notch 5. It will also be appreciated that when the fastener is in an open state the bight of the U-shaped portion of the inner lever section 11 will bear against the edge of the body 3 and thereby hold the lever member in alinement with the body 3.

In the practical use of the fastener, the link 4 is placed in the notch 12 while the outer section 13 of the lever member is in alinement with the inner section 11 of said member. In virtue of this the lever member is manifestly of considerable strength, and is therefore adapted to serve for the adequate tightening of the chain 1 when the lever member is thrown over so as to place its notch 12 opposite the notch 5 in the body 3 and position the link 4 in the said notch 5. After the positioning of the link 4 in the notch 5, the outer section 13 of the lever member is swung inwardly on the hinge pintle and toward one side of the body 3 and so that the slot 15 in the section 13 passes inwardly beyond the turn button 6. The said turn button 6 is then turned to a position at an angle to the slot 15 when as will be readily understood the lever member 10 will be secured in side by side relation to the body 3 so that there will be no possibility of the connected and tightened chain being casually disconnected and released. When, however, it is desired for any reason to dust and remove the chain link 4 from the fastener, the operation described is reversed—i. e., the turn button 6 is turned to a position in registration with the slot in the section 13, the said section 13 is swung away from the body 3 and past the turn button 6, and the lever member 10 as a whole is swung on the pintle 9 until the said lever member 10 is in substantial alinement with the body 3. When the lever member 10 is swung to open position as stated, the link 4 may be removed from the body notch 5 and shifted over the lever member 10 for the disconnection of the ends of the chain, and for the ready removal of the chain from an automobile wheel when the chain is of the wheel type.

In the embodiment of my invention shown in Figures 8, 9 and 10, the fastener body is designated by 3$^a$, and is characterized by notches 5$^a$ arranged adjacent to its ends. Said body 3$^a$ is also characterized by a transverse post 7$^a$ and by turn buttons 6$^a$ the latter arranged at opposite sides of the body 3$^a$ and in spaced relation thereto. In addition to the body 3$^a$ the modification comprises leverage affording members 10$^a$ and 10$^b$ hingedly connected to the opposite ends of the body 3$^a$ at the points 9$^a$. Each of the leverage-affording or lever members includes an inner section 11$^a$ with a notch 12$^a$, and an outer section, the outer section on the section 10$^a$ being numbered 13$^a$, and the outer section on the section 10$^b$ being numbered 13$^b$. The said outer sections are hingedly connected at 14$^a$ to the inner sections, and each is provided with a slot 15$^a$ for the passage of one turn button 6$^a$. I would also have it understood that the sections 13$^a$ and 13$^b$ are each adapted to be alined with the adjacent inner section. The section 13$^a$ however, is adapted to be swung sidewise on its inner section 11$^a$ in one direction, while the section 13$^b$ is adapted to be swung sidewise on its inner section 11$^a$ in the opposite direction. This provision serves when the sections 11$^a$ are swung inwardly on the pivots 9$^a$ to permit one section 13$^a$ to be moved inwardly past one turn button 6$^a$, and the other section 13$^b$ to be moved inwardly past the other turn button 6$^a$. Then when the turn buttons 6$^a$ are positioned at angles to the slots 15$^a$, the sections 13$^a$ and 13$^b$ will be detachably secured in side by side relation to the body 3$^a$. Manifestly the said modified construction is adapted for use in conjunction with a chain having links such as 4 at its opposite ends; and it will also be appreciated that the modification is possessed of all of the practical advantages ascribed to the fastener shown in Figures 1 to 7, the modification being in effect an extension or elaboration of the construction shown in Figures 1 to 7.

In addition to the practical advantages ascribed to my novel fastener it will be readily appreciated that the fastener is simple and inexpensive in construction, is susceptible of ready manipulation without undue effort on the part of an operator, and is well adapted to withstand the usage to which automobile wheel chain fasteners are ordinarily subjected.

I have entered into a detailed description of the construction and relative arrangement of the parts embraced in the present and preferred embodiments of my invention in order to impart a full, clear, and exact understanding of the said embodiments. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters Patent, is:—

1. A fastener comprising a body with a notch, a lever member having an inner section pivotally connected to the body and notched and also having an outer section hingedly connected for sidewise swinging to the inner section and adapted when the inner member is closed to be swung laterally against one side of the body, and means carried by the body and adapted after the said swinging of the outer section against the body to be moved to position to hold said outer section against lateral movement away from the body.

2. A fastener comprising a body with a notch, a lever member having an inner section pivotally connected to the body and notched and also having an outer section hingedly connected for sidewise swinging to the inner section and adapted when the inner member is closed to be swung laterally against one side of the body, and means carried by the body and adapted after the said swinging of the outer section against the body to be moved to position to hold said outer section against lateral movement away from the body; the said outer section of the lever member being provided with a slot, and the said holding means on the body being in the form of a turn button.

3. A fastener comprising a body with a notch, a lever member having an inner section pivotally connected to the body and notched and also having an outer section hingedly connected for sidewise swinging to the inner section and adapted when the inner member is closed to be swung laterally against one side of the body, and means carried by the body and adapted after the said swinging of the outer section against the body to be moved to position to hold said outer section against lateral movement away from the body; the said inner section of the lever member being of U-shape in cross-section whereby when the lever member is closed said inner section will straddle the body and when said lever member is open the bight of the inner section thereof will bring up against the edge of the body for the purpose set forth.

4. A fastener comprising a body with a notch, a lever member having an inner section pivotally connected to the body and notched and also having an outer section hingedly connected for sidewise swinging to the inner section and adapted when the inner member is closed to be swung laterally against one side of the body, and means carried by the body and adapted after the said swinging of the outer section against the body to be moved to position to hold said outer section against lateral movement away from the body, in combination with a chain to which one end of the body is pivotally connected, said chain having a link to be seated in the notch of the lever member and to be transferred by manipulation of said lever member into the notch of the body.

5. A fastener for interposition between and connected to spaced links, the said fastener comprising a body with notches adjacent to its ends, lever members pivotally connected to the end portions of the body and each including an inner notched section and an outer section hinged for sidewise swinging to the inner section, and means carried by the body at the opposite sides thereof and adapted when the lever members are closed and the hinged sections of said lever members are swung against opposite sides of the body to detachably secure said hinged sections against opposite sides of the body.

6. A fastener for interposition between and connected to spaced links, the said fastener comprising a body with notches adjacent to its ends, lever members pivotally connected to the end portions of the body and each including an inner notched section and an outer section hinged for sidewise swinging to the inner section, and means carried by the body at the opposite sides thereof and adapted when the lever members are closed and the hinged sections of said lever members are swung against opposite sides of the body to detachably secure said hinged sections against opposite sides of the body; the said hinged sections of the lever members being each provided with a slot, and the holding means at opposite sides of the body being in the form of turn buttons.

In testimony whereof I affix my signature.

ERNEST B. NENTWIG.